Aug. 23, 1966   YOSHIO MIYATA   3,267,779
METHOD AND APPARATUS FOR CUTTING BARS
Filed April 16, 1964

YOSHIO MIYATA
Inventor

By Wenderoth, Lind & Ponack
Attorneys

United States Patent Office 3,267,779
Patented August 23, 1966

3,267,779
METHOD AND APPARATUS FOR CUTTING BARS
Yoshio Miyata, 4 4-chome, Nishinagasuhondori,
Amagasaki, Japan
Filed Apr. 16, 1964, Ser. No. 360,224
Claims priority, application Japan, Apr. 16, 1963,
38/20,223
3 Claims. (Cl. 82—46)

The present invention relates to a method of cutting bars of hard material, such as metal, and to an apparatus for carrying out this method.

Heretofore, it has commonly been the practice when cutting through a metal bar transversely to the length thereof, to use a rotating or reciprocating sawblade and start sawing at one side of the bar and saw through the full thickness of the bar to the other side thereof. While this method of sawing a bar is satisfactory in that it does get the bar cut, it requires that the sawing apparatus be able to move at least equal to the diameter of the bar, and in addition, particularly when a reciprocating sawblade is used, the cut surface is not smooth and must have a finishing operation performed upon the whole of the cut surface after the cutting is completed.

It is an object of the present invention to provide a method of cutting through bars of a hard material, such as metal, in which the bar is rotated from the start of the cutting operation is performed, and then the bar is held fixed while the remainder of the cutting operation is performed.

It is a further object of the present invention to provide an appartaus for carrying out the method in which a base has a cutting arm pivotally mounted thereon, and cutting means are mounted on the cutting arm. Vise means are provided on the base beneath the cutting means on the cutting arm, and an apparatus for rotating a bar to be cut is positioned adjacent the vise means for rotating the bar to be cut within the vise means for a portion of the cycle of operation of the cutting means. Control means actuated by the movement of the cutting arm is coupled to the rotating apparatus and the vise means for stopping the rotating means and actuating the vise means to close it on the bar, and for releasing the vise means when the movement of the cutting arm is complete.

Other and further objects of the present invention will become apparent from the following specification and claims, taken together with the accompanying drawings, in which:

Figure 1:
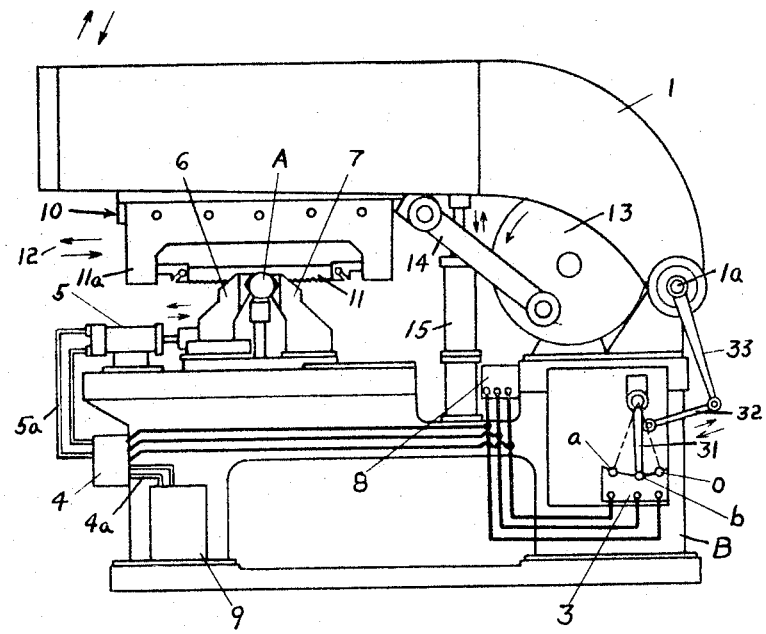
FIG. 1 is a side elevation view of a preferred embodiment of a sawing apparatus according to the present invention.

The apparatus shown in the figures has a base B on which is pivotally mounted a cutter arm 1, the cutter arm being pivoted to the base B at 1a. Mounted on the cutter arm 1 is a saw means 10 which in the present embodiment is a saw blade 11 mounted on a saw blade carrier 11a reciprocally movable along the cutter arm 1 in the direction of the arrows 12. Saw driving means are provided in the form of a flywheel 13 rotatably mounted on the base B and driven by drive means (not shown). Eccentrically pivoted to the flywheel 13 is a link 14 which has the other end pivoted to the reciprocally mounted saw blade carrier, so that rotation of the flywheel 13 reciprocates the saw blade carrier 11a and the saw blade 11 back and forth along the arm 1.

Beneath the arm 1 on the base B is a bar holding vise having a fixed jaw 7 and a movable jaw 6 movable along the base parallel to the direction of movement of the saw blade 11 toward and away from the fixed jaw 7. The jaws 6 and 7 are adapted to be moved toward each other to hold a bar A between them with the axis transverse to the direction of movement of the arm 1. Jaw moving means in the form of a hydraulic piston-cylinder means 5 is coupled to the movable jaw 6 for moving the jaw, and hydraulic fluid conduits 5a connect the hydraulic piston-cylinder means 5 to a control valve 4, for example a solenoid valve, which in turn is connected by the conduits 4a to a pump and reservoir 9 for hydraulic fluid.

A limit switch 3 is mounted on the base B and has three contact points thereon, points a, b and o. The contact arm 31 of the limit switch has a link 32 pivoted thereon, and pivoted to the other end of the link 32 is the free end of an arm 33 which is connected to the arm 1 at the pivot point 1a therefor so as to move with the arm 1. The contact arm 31 will therefore move progressively across contacts a, b and o as the arm 1 is lowered.

Also mounted on the base B is a raising and lowering means for the arm 1, here shown in the form of a hydraulic piston-cylinder member 15, connected to a control valve 8, for example a solenoid valve and pump 9 by conduits (not shown).

Figure 2:
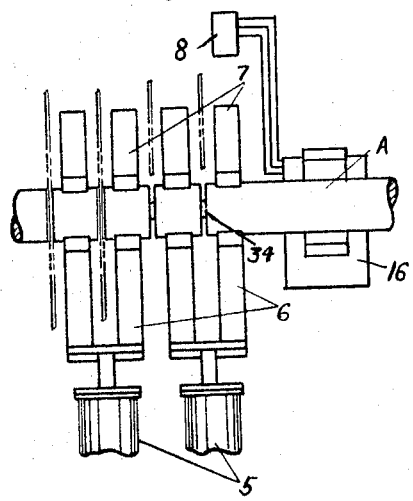
FIG. 2 is a partial plan view of the base of the apparatus of FIG. 1 with the cutting arm removed.

As seen in FIG. 2, a bar rotating means 16 is positioned next to the base B and has means thereon, for example a bar grasping chuck, which is rotated by drive means forming part of the bar rotating means. Included in the bar rotating means is a control for starting and stopping the drive means, all of these parts being conventional and being well known to those skilled in the art.

The starting and stopping means for the bar rotating drive is electrically interconnected with the limit switch 3, the control valve 8 and the control valve 4 by circuits well known to those skilled in the art, so that when the contact arm 31 of the limit switch is moving from the contact a to the contact b, and the movable jaw 6 of the vise is withdrawn, the bar rotating means 15 is rotating the bar A, and when the contact arm contacts the contact b, the start and stop means on the bar rotating drive stops the bar rotating drive, and at the same time the control valve 4 is energized to direct hydraulic fluid so as to close the movable jaw 6, and when the contact arm reaches the contact o, the control valve 4 is actuated to reverse the flow to withdraw the movable jaw 6, and the control valve 8 is actuated to direct fluid to cause the raising and lowering means 15 to lift the arm 1. Valve 8 is moved to direct fluid to start arm 1 moving down again when the arm contacts contact a. The limit switch is reset by movement of linkage 37, 33 during the raising of arm 1.

In operation, a bar is clamped in the bar rotating means 15 and is placed between the jaws 6 and 7 of the vise. The limit switch 3 has the contact arm 31 placed in the contact a position and the apparatus is started. As the bar A rotates, the saw blade 11 will be reciprocated back and forth across the periphery of the bar A as the bar A is rotated, and will be lowered by the lowering of arm 1 by the raising and lowering means 15, thereby forming a slot 34 of uniform depth around the bar at the place where it is to be cut. When a predetermined depth of cut is reached, the arm 31 will contact the contact b on the limit switch, and the rotation of the bar A will be stopped and the jaw 6 will be closed against the bar A and jaw 7. The reciprocation of the saw blade 11 and the lowering of the arm 1 will continue, however, so that as the bar is held tightly, the central uncut portion of the bar A will be cut through. At this point, the arm will be at its lowest point, but this point will only be at a level such that the cutting edge of the sawblade is only slightly below the axis of the bar A. At this point, the contact arm 31 will contact the contact o, the arm 1 will be raised, and the movable jaw 6 will be withdrawn, thereby releasing the cut off section of the bar A.

As seen in FIG. 2, there can be a plurality of jaws 6 and 7 and a plurality of sawblades 11 mounted on the arm 1 if it is desired to make a plurality of cuts through the bar A.

It is preferred in carrying out the method of the present invention and in operating the apparatus to cause the sawblade to cut into the rotating bar a distance such that the diameter of the uncut core is from 20–40% of the diameter of the bar before stopping rotation of the bar and cutting on a fixed bar.

It will thus be seen that there has been provided a method and an apparatus in which the movement of the sawblade transversely of the bar has been kept to a minimum and all of the periphery of the bar has been acted upon by the sawblade, thereby greatly increasing the sawing efficiency. The apparatus performs the transition from cutting a rotating bar to cutting a fixed bar automatically. Further, it has been found that the surface of the cut is much smoother, and the amount of work involved in the finishing operation is greatly reduced, thereby cutting the costs of cutting bars.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

What is claimed is:

1. An apparatus for cutting bars of hard material, comprising a base, a cutter arm pivotally mounted on side base and pivotable toward and away from said base, at least one saw means mounted on said cutter arm and having drive means coupled thereto, a vise on said base below the saw means on said cutter arm, said vise having at least one pair of opposed jaws adapted to hold a bar to be cut so that it extends transversely of the direction of movement of said cutter arm and saw means, at least one of said jaws in said at least one pair being movable toward and away from the other jaw, jaw moving means coupled to said movable jaw, means on said base and acting on said cutter arm for raising and lowering the cutter arm, bar rotating means adjacent said base for holding and rotating a bar, said bar rotating means having start and stop means as a part thereof, and control means on said apparatus actuated by movement of said cutter arm and interconnected with said jaw moving means, said raising and lowering means and said start and stop means for said bar rotating means for stopping the bar rotating means when the depth of cut reaches a predetermined limit and at the same time controlling movement of the jaw moving means to close the movable jaw on the bar, and for controlling the movement of the jaw moving means to open the movable jaw and to raise the cutter arm when the saw means cuts through the bar.

2. An apparatus as claimed in claim 1 in which there are a plurality of saw means and a plurality of pairs of jaws, each having one movable jaw, said saw means being positioned on said cutter arm to cut a bar at points between adjacent pairs of jaws.

3. An apparatus as claimed in claim 1 in which said control means comprises a limit switch with a pivotable contact arm, and a linkage having one link pivoted at one end to the pivotable contact arm of the limit switch, and an arm having one end fixed to the cutter arm at its pivot point on said base and having the other end of said link pivoted thereto, whereby the contact arm of the limit switch is caused to move in response to the movement of the cutter arm.

References Cited by the Examiner

UNITED STATES PATENTS

| | | | |
|---|---|---|---|
| 2,471,700 | 5/1949 | Podhajsky | 83—647 |
| 2,623,270 | 12/1952 | Hatch | 83—647 |
| 2,961,764 | 11/1960 | Frojd | 29—558 |
| 2,966,741 | 1/1961 | Sullivan | 29—558 |

WILLIAM W. DYER, Jr., *Primary Examiner.*

ANDREW R. JUHASZ, *Examiner.*

HARRISON L. HINSON, J. L. SEITCHIK,
*Assistant Examiners.*